United States Patent Office 2,998,226
Patented Aug. 29, 1961

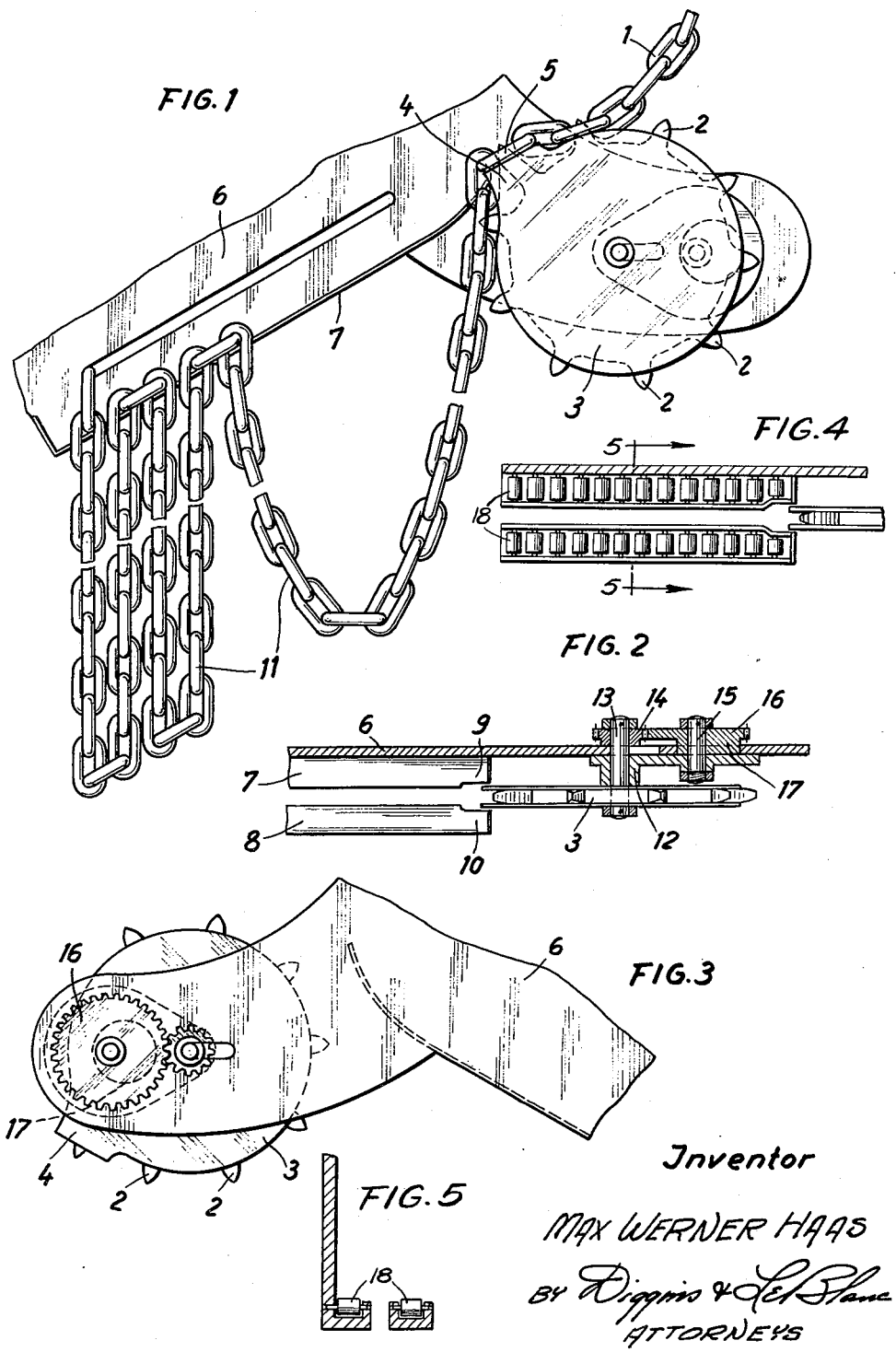

2,998,226
AUTOMATIC CHAIN STORING DEVICE
Max Werner Haas, Franz-Jurgen-Strasse 12,
Dusseldorf, Germany
Filed June 4, 1959, Ser. No. 817,935
6 Claims. (Cl. 254—167)

The invention relates to an automatic chain storing device in which the chain is transferred to a storage point having two parallel guides preferably consisting of rails or the like and, in being stored, is divided into strands of equal length which hang from the storage point.

For side-bar chains, such as are used, for example, in the technique of lifting tackle, a method of storing is known in which a storage arrangement composed of parallel inclined rails is used. The chain to be stored is guided over a sprocket wheel and divided into strands of the same length. For this purpose the chains must be provided at certain intervals apart with link pins, the ends of which project from both sides of the chain and rest on the rails of the storage arrangement, while the actual chain strand between two such link pins hangs freely. Owing to the inclination of the rails of the storage arrangement, the projecting ends of the link pins slide thereon until the strands of the chain hanging therefrom bear one against the other.

The invention relates to a device which allows the automatic storing of calibrated round link chains and enables the length of the chain strands to be stored to be adjusted as desired.

According to the invention the device consists of a toothed wheel, preferably mounted on a sliding frame or the like and provided with a projection serving as rest for a link of the chain to be stored, and of a storage arrangement provided with a collecting mouth directed towards the toothed wheel and to which the toothed wheel in rotating feeds the chain link resting on the projection. The spacing of the parallel guides of the storage arrangement on which the chain links transferred by the toothed wheel rest with their side bars, is so chosen that the chain links following the chain link supported by the guides, hanging down transversely to this link and which form the beginning and the end respectively of the chain strand to be stored, can pass freely.

Instead of smooth rails or the like, a plurality of rollers arranged one behind the other may be provided as guides. As by this construction the friction will be considerably reduced, such roller guides can be arranged almost horizontally.

The length of the individual chain strands stored is determined by the diameter of the chain wheel because at each rotation thereof a chain link comes to rest on the projection of the toothed wheel and is fed to the storage arrangement. However, to enable chain strands of greater length to be stored, the toothed wheel is, according to the invention, slidable perpendicularly to its axis of rotation, that is, is positively slidable in the direction towards or away from the storage arrangement. This shifting movement is effected periodically by an eccentric gear the drive for which is derived from the rotation of the toothed wheel. By this means the transfer of a chain link to the storage arrangement takes place at intervals determined by a certain number of revolutions of the toothed wheel, the number of revolutions of the toothed wheel between two transferring operations being adjustable by changing the ratio of transmission of the eccentric gear. The periodic to and fro movement of the toothed wheel is thus controlled according to the selection of the ratio of transmission so that, for example, only after the toothed wheel has performed three revolutions is the projection of the toothed wheel brought into such a position in relation to the mouth of the storage arrangement that the transfer of a chain link can take place.

An embodiment of the invention is illustrated by way of example in the accompanying drawing, in which:

FIG. 1 shows in side elevation a storage device equipped with guide rails, one of which is omitted to show the storage operation more clearly;

FIG. 2 shows the device in top plan view, partly in section;

FIG. 3 is another side elevation of the device, viewed from the other side, and

FIGURES 4 and 5 are a plan view and cross section respectively of a modified embodiment of the present invention.

The chain 1 to be stored runs on a winch or windlass (not shown) into the storage device. In so doing it engages a sprocket or toothed wheel 3 provided with teeth 2 and imparts rotary movement thereto. The toothed wheel has a projection 4, the upper boundary of which is inclined in relation to the normal line extending from the center of the toothed wheel 3. The projection 4 is so arranged that a link 5 of the chain 1 to be stored lies flat thereon. The storage arrangement in this form of construction is inclined and has two rails 7 and 8 serving as guides, their ends 9, 10 directed towards the toothed wheel 3 forming a catching mouth. These ends 9, 10 of the rails 7, 8 are offset so that the projection 4 of the sprocket or toothed wheel 3 can pass between them.

It is also possible to provide as guides a number of rollers 18 arranged one behind the other as shown in FIGURES 4 and 5. In this case the storage arrangement can be arranged almost horizontally because the friction is considerably reduced by the rollers.

The process of storing now takes place in such a manner that on the rotation of the toothed wheel 3, the chain link 5 resting on the projection 4 is prevented by the ends 9, 10 of the rails 7, 8 from being further entrained by the toothed wheel 3. Whereas the projection 4 passes between the ends 9, 10 of the rails 7, 8, the chain link 5 engages these ends and slides along the rails 7, 8 until it comes to a stop. The gap between the guides is so dimensioned that the links adjoining those picked up by the guides can hang freely between the guides.

To make it possible to change the length of the chain strands 11 to be stored, the toothed wheel 3 is slidable in a frame 12 or the like, the shifting movement being effected in the direction towards and away from the storage arrangement 6 and is a positive periodical movement. For this purpose a pinion 14 is mounted on the axle 13 of the toothed wheel 3 and meshes with an eccentric gear wheel 16 keyed on a second axle 15. This axle is connected with the hub 17 of the eccentric so that on the rotation of the toothed wheel 3, it is at the same time displaced. According to the ratio of transmission chosen, which can be easily changed by exchanging the pinion 14 and gear wheel 16, the projection 4 in performing one revolution is brought into direct proximity to the catching mouth, that is it passes between the ends 9, 10 of the rails 7, 8 so that the chain link resting on the projection is transferred to the rails, whereas during the next or any desired number of following rotations of the toothed wheel 3 the projection 4 is in such a position that no transfer takes place. The length of the chain strands to be stored is therefore adjustable in this manner to meet requirements.

I claim:

1. An automatic chain storing device for storing link chains in the form of suspended chain strands comprising a chain wheel having peripheral teeth for carrying the links of a chain, a pair of parallel guides inclined to the horizontal and terminating adjacent the periphery of said wheel, said parallel guides being separated by a distance less than the width of a chain link but greater than the chain link thickness, said chain wheel having a projection extending radially beyond said teeth for transferring a chain link to said parallel guides, said projection passing between the spaced ends of said parallel guides to deposit a chain link with each edge resting on one of said guides.

2. A chain storing device according to claim 1 wherein the distance between said ends of said guides is increased to permit passage of said projection but is still less than the width of a chain link.

3. A chain storing device according to claim 2 wherein the guides comprise a plurality of rollers arranged in series which serve as a support for the chain links transferred to the guides.

4. A chain storing device according to claim 1 wherein said guides comprise a pair smooth rails which serve as a support for the chain links transferred to said guides.

5. An automatic chain storing device for storing link chains in the form of suspended chain strands comprising a chain wheel having peripheral teeth for carrying the links of the chain, a pair of parallel guides inclined to the horizontal and terminating adjacent the periphery of said wheel, said parallel guides being separated by a distance less than the width of a chain link but greater than the chain link thickness, said chain wheel having a projection extending radially beyond said teeth for transferring a chain link to said parallel guides, said projection passing between the spaced ends of said parallel guides to deposit a chain link with each edge resting on one of said guides, a reciprocating frame supporting said chain wheel, said frame being driven by an eccentric gear wheel rotated through a gear train from said chain wheel.

6. A chain storing device according to claim 5 wherein said chain wheel is rotatable upon an axle, a mounting bracket supporting said frame, said axle passing through an elongated slot in said mounting bracket, and a pinion provided on the end of said axle and meshing with said eccentric gear wheel to drive said frame.

References Cited in the file of this patent

UNITED STATES PATENTS

| | | |
|---|---|---|
| 1,239,110 | Knutson | Sept. 4, 1917 |
| 2,286,388 | Smith | June 16, 1942 |

FOREIGN PATENTS

| | | |
|---|---|---|
| 397,322 | France | Feb. 19, 1909 |
| 752,530 | Great Britain | July 11, 1956 |